United States Patent [19]

Beyer et al.

[11] 4,434,989
[45] Mar. 6, 1984

[54] SEALING GASKET

[75] Inventors: Horst Beyer; Klaus Lönne, both of Burscheid; Klaus-Peter Majewski, Odenthal-Erberich, all of Fed. Rep. of Germany

[73] Assignee: Goetze AG, Burscheid, Fed. Rep. of Germany

[21] Appl. No.: 340,514

[22] Filed: Jan. 18, 1982

[30] Foreign Application Priority Data

Jan. 22, 1981 [DE] Fed. Rep. of Germany ....... 3101921

[51] Int. Cl.$^3$ .............................................. F16J 15/06
[52] U.S. Cl. ................................. 277/235 B; 277/166
[58] Field of Search ..................... 277/153, 235 B, 166, 277/22

[56] References Cited

U.S. PATENT DOCUMENTS

| | | | |
|---|---|---|---|
| 2,330,106 | 9/1943 | Bernstein et al. | 277/235 B |
| 3,572,731 | 11/1968 | Stecher | 277/153 |
| 4,103,913 | 8/1978 | McDowell | 277/235 B |
| 4,351,534 | 9/1982 | McDowell | 277/235 B |

FOREIGN PATENT DOCUMENTS 1650026 8/1970 Fed. Rep. of Germany .
1247166 9/1971 United Kingdom .

OTHER PUBLICATIONS

Der "Nahmaschineneffekt" by Flachdichtungen–Reinz Co., Jan. 22, 1981.

Primary Examiner—Robert I. Smith
Attorney, Agent, or Firm—Spencer, Kaye & Frank

[57] ABSTRACT

A flat sealing gasket, such as a cylinder head gasket, for an internal combustion engine, has at least one opening, a cross-sectionally generally U-shaped armor framing the opening. The armor has legs straddling marginal edge zones of the gasket defining the opening. Each armor leg has an inner face in engagement with the gasket and an outer face oriented away from the gasket. A low-friction coating is provided on the outer face of at least one of the armor legs. Those sealing faces of the gasket which are externally of the armor are substantially free from the low-friction coating.

9 Claims, 6 Drawing Figures

SEALING GASKET

BACKGROUND OF THE INVENTION

This invention relates to a flat sealing gasket, particularly a cylinder head gasket, made of impregnated asbestos fiber and including an armor which has a U-shaped cross section and which frames edge portions of the gasket, particularly for the purpose of surrounding a circular gasket opening intended to be in registry with a combustion chamber of an internal combustion engine.

Cylinder head gaskets intended for internal combustion engines are preferably made of sheet metal (steel) or an impregnated asbestos fiber material reinforced with metal components. Such a head gasket is provided with a plurality of relatively large circular openings for alignment with the combustion chambers and is further provided with relatively smaller openings intended to be aligned with ports through which lubricating and/or coolant flows or through which securing bolts pass. Particularly the openings intended for the combustion chambers and occasionally also the openings to be aligned with ports carrying liquid are surrounded (framed) by an armor formed of a cross-sectionally U-shaped metal frame which, with the legs of the "U", straddles edge portions of the gasket. Such armor is provided for increasing the sealing pressure and the sealing pressure force in the gasket zones sandwiched between the legs of the armor. For increasing the micro-seal or macro-seal and for the particular protection against the effects of the fluids, the entire outer surface of the armor is provided with a synthetic layer.

During the operation of an internal combustion engine the cylinder head gasket is, in addition to the static stress in an axial direction, further stressed by shifts of the engine block and the cylinder head in the radial direction. As described in an article entitled "Der 'Nähmaschineneffekt' an Flachdichtungen" ("The 'Sewing Machine' Effect in Flat Gaskets") published by the Reinz Company in its publication entitled "Informationen aus der Dichtungstechnik", Issue 10, 1975, page 32, such displacements are caused principally by the alternating thermal expansion and contraction of the engine block and cylinder head during the alternating heating and cooling of the engine during operation. Particularly in case of engines having aluminum cylinder heads and cast iron engine blocks, relative displacements between these two components occur because of the different coefficients of thermal expansion of the two metals. This results in a frictional shearing stress exerted on the cylinder gasket, adversely affecting the sealing properties thereof.

In cylinder head gaskets the above-noted armor is also exposed to stresses. In particular, in the zones of curvatures at the cut edges of the gasket opening, breaks may occur which may progressively lead to the destruction of the entire armor. As disclosed, for example, in German Pat. No. 1,650,026, it has been the view heretofore that only axially oriented oscillations between the engine block and the cylinder head stress the curved portions of the armor and cause breakages thereof. It has therefore been attempted to render the armor particularly resistant against bending by inserting thereinto spring rings and/or by particularly shaping the curved portions. It has been found however, that breakages could not be reliably eliminated by these measures.

In order to avoid wear of sealing faces of cylinder head gaskets, caused by the above-discussed shifting motions of the engine block and the cylinder head gasket, it is known, as disclosed, for example, in U.S. Pat. No. 4,103,913, to coat the sealing faces of metallic seals—which do not have armors around the openings—with friction reducing coatings, essentially consisting of fluoropolymers having molybdenum disulfide additives. By reducing the sliding friction in this manner, a force transmission to the sealing faces is essentially eliminated and thus a destruction of the cylinder head gasket is prevented. The use of such gaskets, however, because of the low-friction coating, significantly increases the amplitude of the shifting motions of the engine block and the cylinder head. Such substantially greater displacements disadvantageously reduce the effect of the micro-seal and the macro-seal of the gasket, particularly as concerns the hot combustion gases.

SUMMARY OF THE INVENTION

It is an object of the invention to provide an improved cylinder head gasket with armor, particularly for framing openings to be aligned with combustion chambers in internal combustion engines having an aluminum cylinder head and a cast iron engine block, wherein the armor is in a substantial measure protected against breakage and wherein the effects of a micro-seal and a macro-seal are preserved. It is a further object of the invention to provide a cylinder head gasket which may be simply and inexpensively manufactured.

These objects and others to become apparent as the specification progresses, are accomplished by the invention, according to which, briefly stated, the outer face of at least one armor leg facing the cylinder head and/or the engine block is provided with a sliding friction-reducing coating, while all other surface regions of the gasket are substantially free from such a coating. Coatings of polytetrafluoroethylene or commercially available low-friction lacquers with or without additives of solid slide-enhancing material such as molybdenum disulfide, graphite or boron nitride are preferred. The thickness of the layer depends upon operational and structural parameters and is preferably between 0.1 and 0.001 mm.

If required, the low-friction coating, particularly in case of particular engines with wet cylinder liners, may cover an adjoining zone of the gasket beyond the armor legs.

The gasket according to the invention has been tested in engines having an aluminum cylinder head and a cast iron engine block. For simulating conditions of extreme shifting motions, the cylinder head was heated and cooled in short successive cycles and the results obtained were compared with those obtained with conventional gaskets without low-friction coating and with gaskets coated on their entire surface with a low-friction layer. It was unexpectedly found that in gaskets structured according to the invention, no breakages of the armor had occurred while in the conventional gaskets a multiple breakage of the armor was observed. As compared to gaskets coated on their entire face, the displacement amplitudes of the gasket structured according to the invention were substantially reduced. The macro-seal and micro-seal of the gasket according to the invention was good and was within tolerances.

It has been found that contrary to the assumption expressed in German Pat. No. 1,650,026, the oscillations of cylinder head and engine block are not exclusively responsible for breakage in the armor, but that the shifting motions of the two components (cylinder head and engine block) are apparently the greater causes. Thus, it appears that in conventional non-coated armors, by means of friction there occurs a marked force transmission to the armor so that in case of relative motions, the armor is distorted towards the side of the cylinder head which expands to a greater extent and thus in the zone of the curvatures of the armor tearing stresses appear. The friction-reducing (low-friction) coating on the outer armor faces according to the invention reduces the friction and consequently reduces the force transmission which would lead to breakage. The friction-reducing coating which, according to the invention, is omitted on purpose from the remaining surfaces of the gasket brakes the shifting motion of the cylinder head and the engine block to a minimum value. As opposed to a gasket whose entire surface is provided with a friction-reducing coating, the gasket according to the invention has a sufficient micro-seal and macro-seal effect.

Since the invention readily and advantageously may find application in impregnated cylinder head gaskets disclosed in German Accepted Published Patent Application (Auslegeschrift) No. 2,304,558, the increased friction can cause no damage in view of the high-strength soft material of the gasket. On the contrary, it was found that the remaining surface portions may be even coated with particular, friction-enhancing materials having a braking or adhesion effect, such as elastomers, particular synthetic resins or water glass with or without friction-enhancing solid additives such as quartz powder or corundum powder for increasing the braking effect. The friction-reducing and/or braking layers may be additionally coated with layers enhancing the micro-seal.

Since the shifting motion between the cylinder head and the engine block is greater in the external zones than in the inner zones of the gasket and thus the armors are not stressed uniformly, it is sufficient to provide the armors only partially with the friction-reducing layer. Preferably, in case of gaskets used for multi-cylinder engines, only the armor leg faces of the externally situated (flanking) openings at the end faces are partially coated.

While the invention is intended to find application preponderantly in cylinder head gaskets made of soft material or metal, it may be used in other environments, particularly where the gaskets are exposed to forces caused by shifting motions. Such environments, for example, are exhaust flange seals or oil sump seals in automotive vehicles.

DESCRIPTION OF THE PREFERRED EMBODIMENTS

Figure 1:
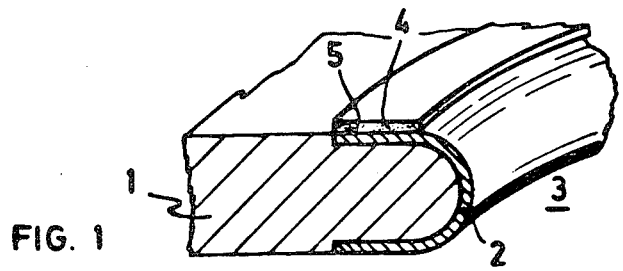
FIGS. 1 through 5 are fragmentary sectional views of a cylinder head gasket in the zone of an opening, illustrating five preferred embodiments of the invention.

Turning to FIG. 1, there is shown a cylinder head gasket body 1 having a circular opening 3 (only fragmentarily shown). The opening 3 is framed by an armor 2 which is U-shaped in cross section and whose legs straddle edge portions of the gasket defining the opening 3. One outer face 5 of the armor 2 is provided with a friction-reducing coating 4 of fluoropolymer. The coating 4 is intended to contact the cylinder head in the installed state of the gasket.

Figure 2:
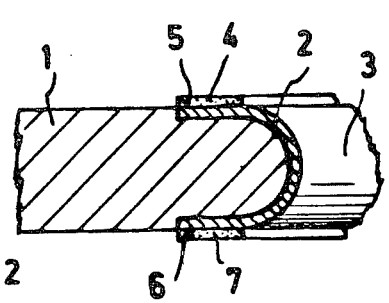

FIG. 2 illustrates an embodiment wherein both outer leg faces 5 and 6 are coated with a friction-reducing layer 4 and 7, respectively.

Figure 3:
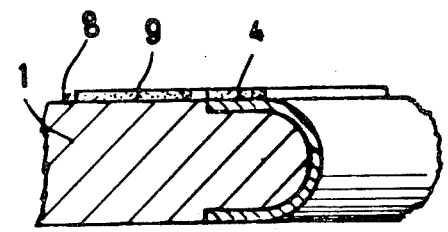

In the embodiment illustrated in FIG. 3, one leg face of the armor is provided with the friction-reducing coating 4 and an adjacent surface area 8 of the gasket body 1 is provided with a friction-enhancing coating 9.

Figure 4:
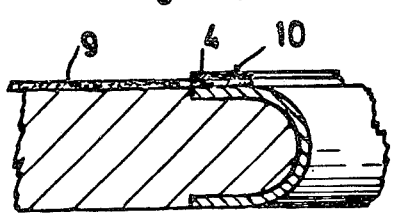

The embodiment shown in FIG. 4 corresponds to that of FIG. 3, except that the friction-reducing coating 4 is provided with a layer 10 enhancing the micro-seal effect. The layer 10 may also be provided on the coating 9.

Figure 5:
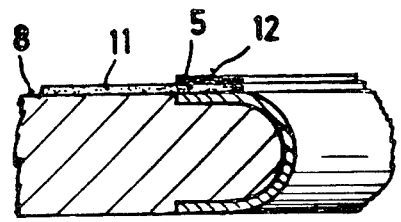

In the embodiments shown in FIG. 5 the entire upper sealing face of the gasket is provided with an adhesive layer 11. The upper armor leg 5 is additionally provided with a friction-reducing layer 12 so that the adhesive layer 11 improves the adhesion of the friction-reducing layer 12 whereas in the remaining area of the gasket face 8 it brakes the sliding motions.

Figure 6:
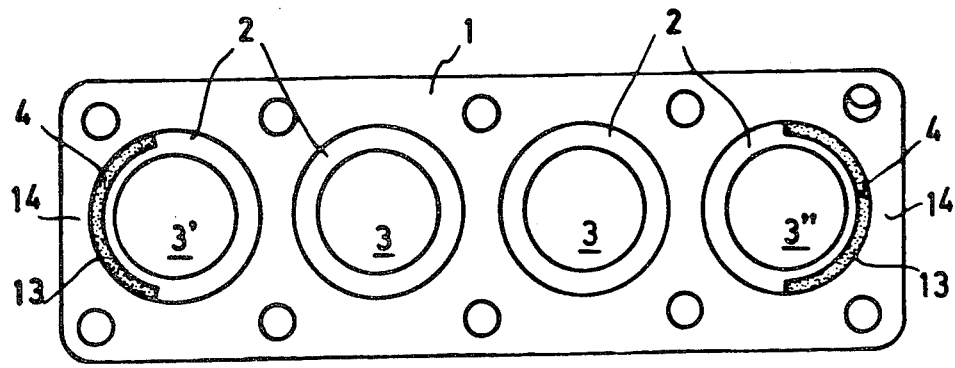
FIG. 6 is a top plan view of a cylinder head gasket incorporating a preferred embodiment of the invention.

FIG. 6 illustrates in top plan view a cylinder head gasket provided with four side-by-side arranged openings 3 to be aligned with respective combustion chambers in the engine. Each opening 3 is framed by an armor 2. The armors 2, at opposite outermost openings 3' and 3" which are exposed to the greatest stresses caused by shifting motions, are partially provided with a friction-reducing layer 4 in sectors 13 at the outer sealing faces 14 of the gasket 1.

It will be understood that the above description of the present invention is susceptible to various modifications, changes and adaptations and the same are intended to be comprehended within the meaning and range of equivalents of the appended claims.

What is claimed is:

1. In a flat sealing gasket having sealing faces on reverse sides thereof; an opening defined in the sealing gasket; a cross-sectionally generally U-shaped armor framing the opening; said armor having legs straddling marginal edge zones of said gasket defining said opening; each armor leg having an inner face in engagement with the gasket and an outer face oriented away from said gasket; the improvement comprising a low-friction coating provided on the outer face of at least one of said armor legs; and wherein said sealing faces externally of said armor are substantially free from said low-friction coating.

2. A flat sealing gasket as defined in claim 1, wherein said low-friction coating is fluoropolymer.

3. A flat sealing gasket as defined in claim 1, wherein said low-friction coating is a low-friction lacquer.

4. A flat sealing gasket as defined in claim 2 or 3, wherein said low-friction coating includes solid lubricating particles.

5. A flat sealing gasket as defined in claim 4, wherein said solid lubricating particles are selected from the group consisting of graphite, molybdenum disulfide and boron nitride.

6. A flat sealing gasket as defined in claim 1, wherein said low-friction coating has a thickness of from 0.001 to 0.1 mm.

7. A flat sealing gasket as defined in claim 1, further comprising a friction-enhancing coating provided on at least one of said sealing faces adjacent of said armor.

8. A flat sealing gasket as defined in claim 1, wherein said low-friction coating covers solely one part of the outer surface area.

9. A flat sealing gasket as defined in claim 8, wherein said gasket has a series of side-by-side arranged openings each formed by a separate said armor; said low-friction coating being applied solely to the two outermost armors in said series of openings; said one part of the outer surface area being oriented towards respective longitudinal ends of said gasket.

* * * * *